(12) United States Patent
Kim

(10) Patent No.: US 6,995,919 B2
(45) Date of Patent: Feb. 7, 2006

(54) F-THETA LENS AND LASER SCANNING UNIT INCLUDING THE SAME

(75) Inventor: Dae-hwan Kim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 10/848,051

(22) Filed: May 19, 2004

(65) Prior Publication Data

US 2004/0257630 A1 Dec. 23, 2004

(30) Foreign Application Priority Data

Jun. 10, 2003 (KR) ............. 10-2003-0037265

(51) Int. Cl.
*G02B 3/00* (2006.01)
*G02B 26/08* (2006.01)

(52) U.S. Cl. .................... 359/662; 359/206
(58) Field of Classification Search ........ 359/205, 359/206, 642, 662, 796, 808; 347/241, 242, 347/244
See application file for complete search history.

(56) References Cited

U.S. PATENT DOCUMENTS 5,751,463 A * 5/1998 Inoue et al. ............. 359/205
5,808,775 A 9/1998 Inagaki et al. ........... 359/212
6,657,761 B2 * 12/2003 Suzuki et al. ............ 359/205

FOREIGN PATENT DOCUMENTS

| JP | 62-255915 | 11/1987 |
| JP | 5-11201 | 1/1993 |
| JP | 5-134197 | 5/1993 |
| JP | 05-188285 | 7/1993 |
| JP | 5-188285 | 7/1993 |
| JP | 05188285 A * | 7/1993 |
| KR | 94-19474 | 8/1994 |

OTHER PUBLICATIONS

Office Action dated Jul 8, 2005 of the Chinese Patent Application No. 200410048463.1.

* cited by examiner

Primary Examiner—Georgia Epps
Assistant Examiner—William Choi
(74) Attorney, Agent, or Firm—Staas & Halsey LLP

(57) ABSTRACT

An f-theta lens and a laser scanning unit including the same are provided. The f-theta lens for a laser scanning unit includes a lens body that to focus incident light onto a scanning surface, and ribs formed on opposite sides of the lens body to protect the lens body, wherein the ribs have variable heights corresponding to a peak height of the lens body such that the ribs are higher than the peak of the lens body at a convex portion of the lens body and lower than the peak of the lens body at a concave portion of the lens body.

20 Claims, 5 Drawing Sheets

F-THETA LENS AND LASER SCANNING UNIT INCLUDING THE SAME

CROSS-REFERENCE TO RELATED APPLICATION

This application claims the priority of Korean Patent Application No. 2003-37265, filed on Jun. 10, 2003 in the Korean Intellectual Property Office, the disclosure of which is incorporated herein by reference.

BACKGROUND OF THE INVENTION

1. Field of the Invention

The present invention relates to an f-theta lens and a laser scanning unit including the same, and more particularly, to an f-theta lens having an improved rib structure protecting an effective portion of the f-theta lens, and a laser scanning unit including the same.

2. Description of the Related Art

A printing machine, such as a laser printer, includes a laser scanning unit that forms a latent electrostatic image corresponding to an image to be printed by radiating light onto a photosensitive medium. Such a laser scanning unit typically includes an optical system as shown in FIG. 1. Referring to FIG. 1, the optical system includes a laser diode 100 which emits laser light. A collimating lens 101 collimates the emitted laser light to be parallel with an optical axis. A slit 102 is attached to a front of the collimating lens 101 to confine transmission of the laser light. A cylinder lens 103 transmits the laser light to a surface of a polygon mirror 104. The polygon mirror 104 is rotated at a uniform rotational velocity by a motor 105, thereby scanning laser light transmitted through the cylinder lens 103. An f-theta lens 110 with a predetermined refractivity polarizes light reflected by the polygon mirror 104 in a main scanning direction, and compensates for an aberration, thereby focusing on a scanning surface. An image forming reflective mirror 107 reflects laser light transmitted through the f-theta lens 110 to form an image in the form of dots on a surface of a photoreceptor drum 108. An optical sensor 106 receives laser light reflected by a synchronous signal detection reflective mirror 109 and performs horizontal synchronization.

Japanese Patent Publication No. H5-188285 discloses an f-theta lens that reduces a deviation of contraction rates with ribs formed on opposite sides of a lens body of the f-theta lens that extend beyond a height of the lens body by the same height along the length of the f-theta lens. However, this f-theta lens has a problem of residual stress.

FIG. 2 is an enlarged side view of the f-theta lens 110 shown in FIG. 1 and cross-sections thereof, taken along lines A–A' and B–B'. Referring to FIG. 2, the f-theta lens 110 includes a lens body 111 that focuses light incident from the polygon mirror 104 onto a scanning surface and ribs 112, formed on opposite sides of the lens body 111 to protect the lens body 111. For clarity of description, the lens body 111 and the ribs 112 are separately illustrated, but actually, the f-theta lens 110 is compose of a single body.

The lens body 111 is a lens having a wave shape and includes a concave portion 111b between two convex portions 111a. The concave portion 111b is in a central portion of the f-theta lens 110 between the convex portions 111a, which are thinner than the concave portion 111b. Light input and output surfaces of the f-theta lens 110, through which light enters and exits the lens body 111, respectively, are convex.

The ribs 112 extend beyond a peak of the lens body 111 by a predetermined height, e.g., 1 mm. The ribs 112 are higher than the surface of an effective portion of the f-theta lens 110 in order to prevent the lens body 111, and more particularly, an effective portion through which the laser light passes, from being scratched when the f-theta lens 110 is kept in a case.

The f-theta lens 110 is usually made of a plastic material using injection molding in order to increase productivity and reduce manufacturing cost. FIG. 3 illustrate a simulation of residual stress that occurs in the f-theta lens 110 due to a mold when the f-theta lens 110 is made of a plastic material using injection molding. Referring to FIG. 3, the f-theta lens 110 contracts toward its center at a predetermined rate within a mold 120 during a cooling process. A contraction rate of the f-theta lens 110 depends on a type of plastic material and manufacturing conditions such as an injection temperature and an injection molding pressure, but is consistent to within 1%. The contraction rate increases as molding thickness increases. When the f-theta lens 110 contracts after injection molding, the portions of the ribs 112 extending beyond the opposite sides of the lens body 111 is restricted by a mold wall 120a when a resin contracts toward the center of the f-theta lens 110, and thus a residual stress due to a bending moment remains in the edge of the lens body 111. As a result, a deviation in the shape of the lens body 111 is large at the opposite sides of the lens body 111.

FIG. 4 is a graph illustrating a deviation of residual stress of a lens body of a conventional f-theta lens after injection molding. The graph is fitted based on measured approximations. Referring to FIG. 4, the lens body 111 has a width of about 4 mm and has a large residual stress at the opposite sides of the lens body 111.

SUMMARY OF THE INVENTION

According to an aspect of the invention provides an f-theta lens including ribs having variable heights with respect to a lens body of the f-theta lens, thereby reducing a distortion of an effective portion resulting from injection molding of the f-theta lens.

According to an aspect of the invention also provides a laser scanning unit including the f-theta lens.

According to an aspect of the invention, an f-theta lens for a laser scan unit comprises a lens body which focuses incident light onto a scanning surface, and ribs formed on opposite sides of the lens body, where the ribs protect the lens body, and have variable heights with respect to a peak of the lens body.

According to an aspect of the invention, a lens body may comprise two convex portions and a concave portion formed between the two convex portions.

According to an aspect of the invention, a portion of the ribs formed at the convex portion may be higher than the peak of the lens body, and a portion of the ribs formed at the concave portion is lower than the peak of the lens body.

According to an aspect of the invention, a lens body and the ribs are formed as a single body.

According to another aspect of the invention, a laser scanning unit comprises a light source, a collimating lane which collimates light emitted from the light source to be parallel with an optical axis, a polygon mirror which scans the light transmitted through the collimating lens, a motor which rotates the polygon mirror, and an f-theta lens which focuses the light reflected from the polygon mirror onto a scanning surface. Here, the f-theta lens comprising a lens body that transmits the light from the polygon mirror, and ribs formed on opposite sides of the lens body to protect the lens body, where the ribs have variable heights with respect to a peak of the lens body.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments taken in conjunction with the accompanying drawings in which.

DETAILED DESCRIPTION OF THE EMBODIMENTS

Figure 1:
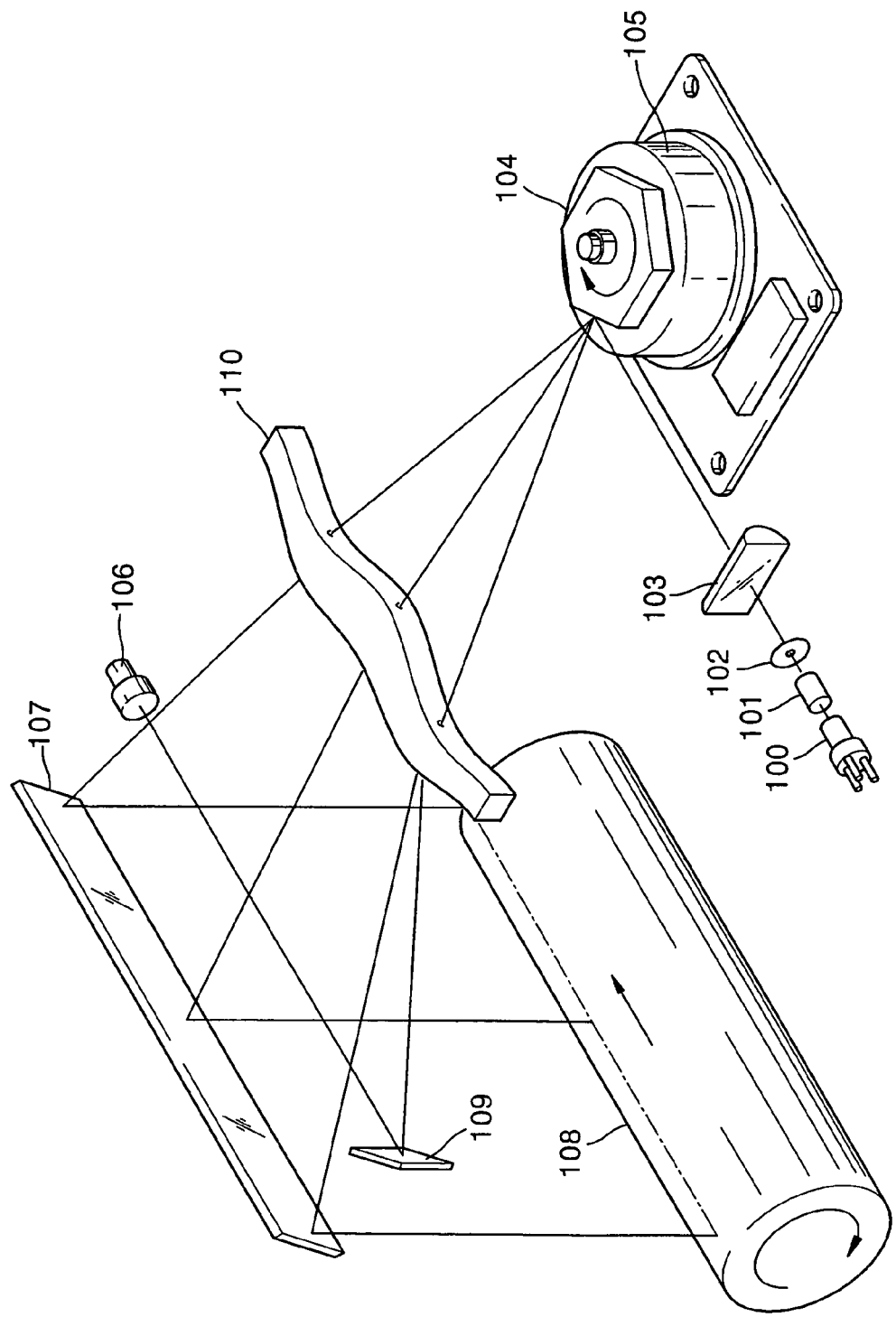
FIG. 1 is a schematic diagram of an optical system of a conventional laser scanning unit.
Figure 2:
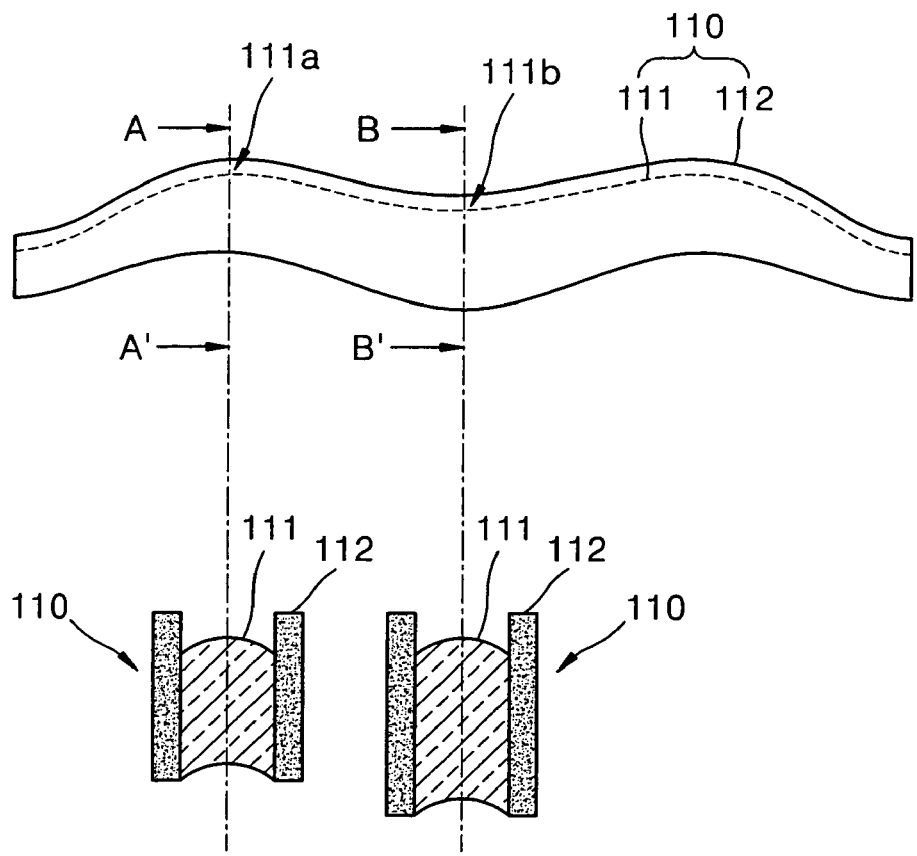
FIG. 2 is an enlarged side view of an f-theta lens shown in FIG. 1 and cross-sections thereof, taken along lines A–A' and B–B'.
Figure 3:
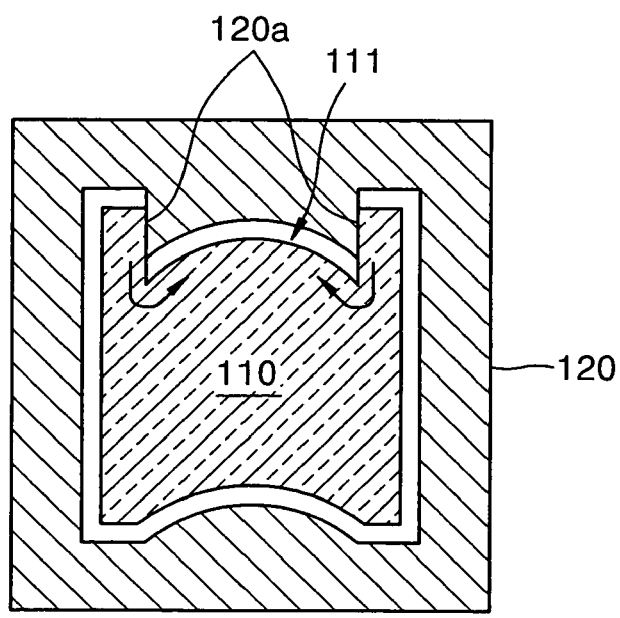
FIG. 3 illustrates a simulation of residual stress occurring in a conventional f-theta lens of FIG. 2 due to a mold when the f-theta lens is made of a plastic material using injection molding.
Figure 4:
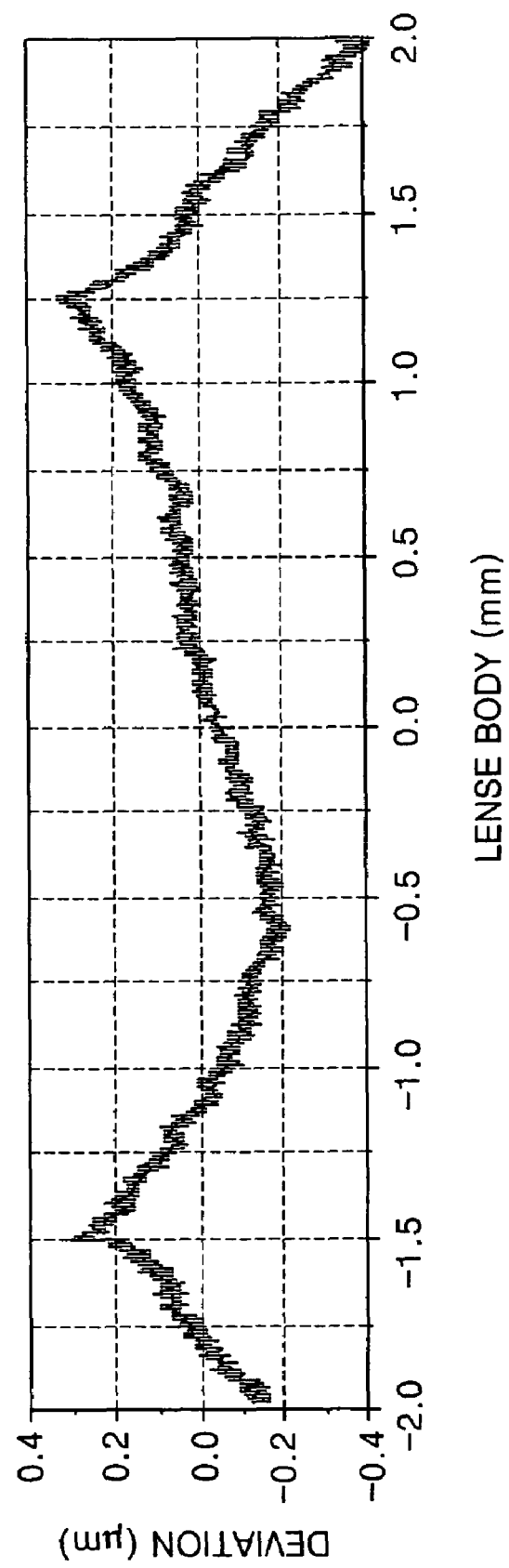
FIG. 4 is a graph illustrating a deviation of residual stress of a lens body of a conventional f-theta lens of FIG. 2 after injection molding.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 5:
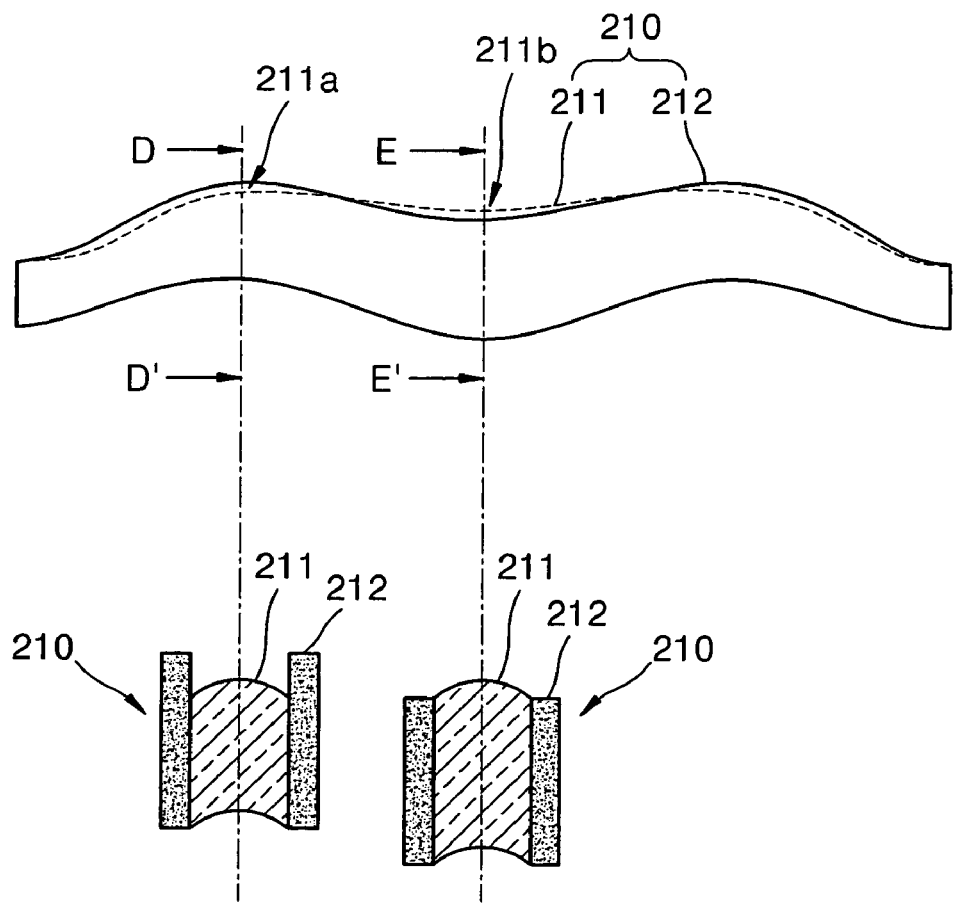
FIG. 5 is a schematic side view of an f-theta lens for a laser scanning unit according to an embodiment of the present invention, and cross-sections of the f-theta lens taken along lines D–D' and E–E'.

FIG. 5 is a schematic side view of an f-theta lens for a laser scanning unit according to an aspect of the invention, and cross-sections of the f-theta lens taken along lines D–D' and E–E'. Referring to FIG. 5, an f-theta lens 210 includes a lens body 211 that focuses light incident from the polygon mirror 104 shown in FIG. 1 onto a scanning surface and ribs 212 formed on opposite sides of the lens body 211 to protect the lens body 211. For clarity of description, the lens body 211 and the ribs 212 are separately illustrated. However, while the ribs 212 can be separately formed, it is understood that according to an aspect of the invention, the f-theta lens 210 is composed of a single body made by injection molding.

The lens body 211 has a wave shape. The lens body 211 includes a concave portion 211b between two convex portions 211a. The concave portion 211b is in a central portion of the f-theta lens 210 between the convex portions 211a which are thinner than the concave portion 211b. Light input and output surfaces of the f-theta lens 210, through which light enters and exits the lens body 211, respectively, are convex. It is understood that other shapes and/or number of concave/convex portions can be used.

The ribs 212 have a shape similar to the lens body 211. In the cross section taken along the line D–D', the ribs 212 are higher than a peak of the lens body 211 by a predetermined height. (e.g., 1 mm) The ribs 212 are higher than the peak of the lens body 211 at the convex portions 211a in order to prevent the lens body 211, and more particularly, an effective portion through which laser light passes, from being scratched when the f-theta lens 210 is kept in a case.

In the cross section taken along the line E–E', the ribs 212 formed at the concave portion 211b are at the same level as opposite sides of the concave portion 211b of the lens body 211. When the ribs 212 in the concave portion 211b are lower than a peak of the concave portion 211b, the peak of the concave portion 211b protrudes from the ribs 212. However, when the f-theta lens 210 is handled, the concave portion 211b of the lens body 211 can be prevented from directly contacting an external object by the ribs 212 of the convex portions 211a adjacent to the concave portion 211b.

According to an aspect of the invention, the f-theta lens 210 is usually made of a plastic material using injection molding in order to increase productivity and reduce manufacturing cost. However, it is understood that other materials and/or methods of manufacture can be used.

Figure 6:
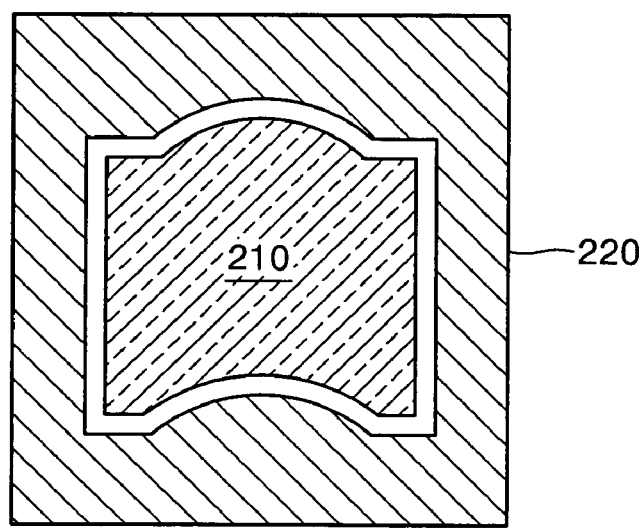
FIG. 6 illustrates a simulation of contraction of the f-theta lens shown in FIG. 5 when the f-theta lens is made of a plastic material using injection molding.

FIG. 6 illustrates a simulation of contraction at the concave portion 211b of the f-theta lens 210 shown in FIG. 5 when the f-theta lens 210 is made of a plastic material using injection molding.

Referring to FIG. 6, the f-theta lens 210 contracts toward its center at a predetermined rate within a mold 220 during a cooling process. A contraction rate of the f-theta lens 210 depends on a type of plastic material and manufacturing conditions such as an injection temperature and an injection molding pressure. However, the contraction rate is generally consistent to within 1%. The contraction rate increases as a molding thickness increases. When the f-theta lens 210 contracts after injection molding, in the portions of the ribs 212 formed as high as the opposite sides of the concave portion 211a of the lens body 211, a resin contracts toward the center of the f-theta lens 210 at a predetermined rate. Accordingly, contraction is not restricted by a mold wall 220a as in a conventional f-theta lens, and therefore, a residual stress resulting from a bending moment does not occur at the edges of the lens body 211.

Figure 7:
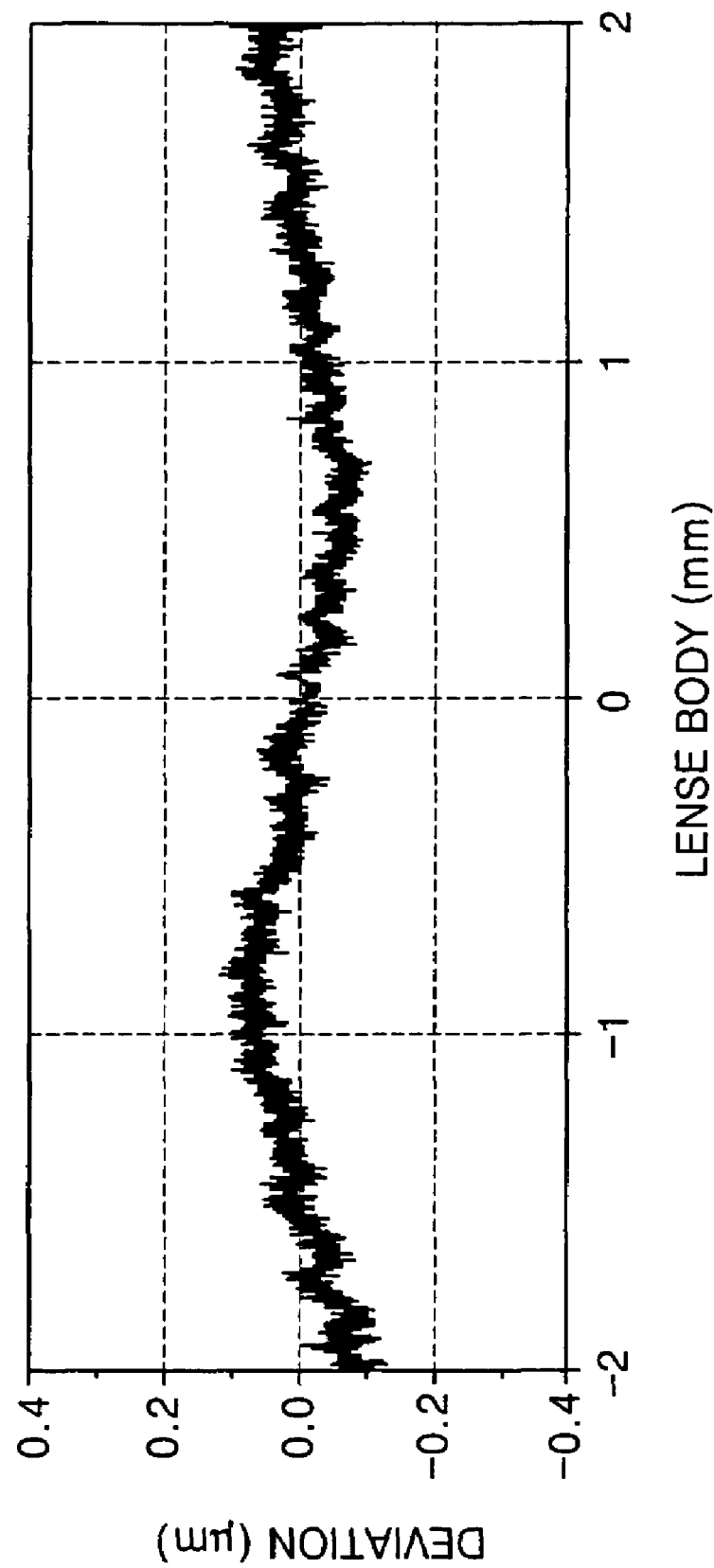
FIG. 7 is a graph illustrating a deviation of residual stress of a lens body of the f-theta lens shown in FIG. 5 after injection molding.

FIG. 7 is a graph illustrating a deviation of residual stress of a lens body of the f-theta lens 210 shown in FIG. 5 after injection molding. The graph is based on measured approximations. Referring to FIG. 7, the lens body 211 of the f-theta lens 210 has a width of approximately 4 mm and has almost no residual stress at the concave portions 211b thereof.

Meanwhile, since the concave portion 211b is a thickest part of the f-theta lens 210, the concave portion 211b of the f-theta lens 210 contracts more than the convex portions 211a. According to an aspect of the invention, a contraction error in the concave portion 211b can be greatly reduced. In addition, variations in resin concentration throughout the f-theta lens 210 can be reduced by decreasing an amount of resin in the concave portion 211b and increasing an amount of resin in the convex portions 211a.

In FIG. 6, the rib 212 is as high as opposite sides of the concave portion 211b. However, it is understood that the rib may be lower than the opposite sides of the concave portion 211b to further reduce the variations in resin concentration throughout the f-theta lens 210.

While described in terms of a laser scanning system for use in printing, it is understood that the invention can be used in other devices and in other contexts in which a variable shaped lens is used.

According to aspects of the invention, ribs formed on the opposite sides of a convex portion of a lens body directly contacting an external object are higher than a peak of the convex portion such that the ribs protect the lens body. In addition, ribs formed on the opposite sides of a concave portion thicker than the convex portion is lower than a peak of the concave portion such that a contraction error due to the variations in resin concentration between the convex portion and the concave portion can be reduced during injection molding.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An f-theta lens for a laser scan unit, the f-theta lens comprising:
   a lens body to focus incident light onto a scanning surface; and
   ribs formed on opposite sides of the lens body to protect the lens body,
   wherein the ribs have variable heights relative to the lens body and the lens body comprises two convex portions and a concave portion formed between the two convex portions, and wherein a portion of the ribs formed at the concave portion is lower than the peak height of the lens body at the corresponding convex portion.

2. The f-theta lens of claim 1, wherein a portion of the ribs formed at each of the convex portions is higher than a peak height of the lens body at the corresponding convex portion.

3. The f-theta lens of claim 1, wherein the portion of the ribs formed at the concave portion is lower than an edge of the lens body at the concave portion.

4. The f-theta lens of claim 1, wherein the lens body and the ribs are formed as a single body by injection molding.

5. A laser scanning unit comprising:
   a light source to emit light;
   a collimating lens to collimate light emitted from the light source such that the light is parallel with an optical axis;
   a polygon mirror to scan the light transmitted through the collimating lens;
   a motor to rotate the polygon mirror; and
   an f-theta lens to focus the light reflected from the polygon mirror onto a scanning surface,
   wherein the f-theta lens comprises:
      a lens body to transmit the light from the polygon mirror; and
      ribs formed on opposite sides of the lens body to protect the lens body, the ribs having variable heights relative to the lens body corresponding to a peak height of the lens body,
      wherein the lens body comprises two convex portions and a concave portion formed between the two convex portions, and wherein a portion of the ribs formed at the concave portion is lower than the peak height of the lens body.

6. The laser scanning unit of claim 5, wherein a portion of the ribs formed at each of the convex portions is higher than the peak height of the lens body at the concave portion.

7. The laser scanning unit of claim 5, wherein the portion of the ribs formed at the concave portion is lower than an edge of the lens body.

8. The laser scanning unit of claim 5, wherein the lens body and the ribs are formed as a single body by injection molding.

9. An f-theta lens directing light onto a scanning surface, the f-theta lens comprising:
   a lens body having a first portion extending outward towards the scanning surface and a second portion not extending as far outward as the first portion; and
   ribs located on opposite sides of each portion of the lens body to protect the lens body from contact by an external object, wherein the ribs located on opposite sides of the first portion extend beyond a peak height of the lens body at the first portion and the ribs located on opposite sides of the second portion do not extend beyond a peak height of the lens body at the second portion.

10. The f-theta lens of claim 9, wherein the peak height of the second portion of the lens body is less than the peak height of the first portion of the lens body.

11. The f-theta lens of claim 10, wherein the first portion is convex and the second portion is concave.

12. The f-theta lens of claim 11, further comprising another convex portion, wherein the concave portion is located between the convex portions.

13. The f-theta lens of claim 11, wherein the ribs located on opposite sides of the convex portions extend beyond the peak height of any portion of the lens body by a predetermined distance.

14. The f-theta lens of claim 13, wherein the predetermined distance is approximately 1 millimeter.

15. The f-theta lens of claim 13, wherein the ribs located on opposite sides of the concave portion extend to a height that is substantially the same as a height of each opposite edge of the concave portion.

16. The f-theta lens of claim 13, wherein the ribs located on opposite sides of the concave portion extend to a height that is lower than a height of each opposite edge of the concave portion.

17. The f-theta lens of claim 11, wherein the concave portion is thicker than the convex portions.

18. The f-theta lens of claim 10, wherein the f-theta lens comprises a plastic material.

19. The f-theta lens of claim 9, wherein the f-theta lens is wave-shaped.

20. The f-theta lens of claim 9, wherein the lens body and the ribs are integrally formed by injection molding.

* * * * *